United States Patent
He et al.

(10) Patent No.: US 11,600,814 B2
(45) Date of Patent: Mar. 7, 2023

(54) NICKEL-CONTAINING POSITIVE ELECTRODE SLURRIES HAVING REDUCED OR ELIMINATED GELATION AND HIGH-ENERGY-DENSITY POSITIVE ELECTRODES FOR ELECTROCHEMICAL CELLS

(71) Applicant: GM GLOBAL TECHNOLOGY OPERATIONS LLC, Detroit, MI (US)

(72) Inventors: Meinan He, Madison Heights, MI (US); Biqiong Wang, Madison Heights, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 142 days.

(21) Appl. No.: 17/158,737

(22) Filed: Jan. 26, 2021

(65) Prior Publication Data
US 2022/0238861 A1   Jul. 28, 2022

(51) Int. Cl.
*H01M 4/00* (2006.01)
*H01M 4/36* (2006.01)
(Continued)

(52) U.S. Cl.
CPC ........... *H01M 4/364* (2013.01); *H01M 4/505* (2013.01); *H01M 4/525* (2013.01);
(Continued)

(58) Field of Classification Search
CPC .......... H01M 4/36; H01M 4/505; H01M 4/58; H01M 4/62
See application file for complete search history.

(56) References Cited

U.S. PATENT DOCUMENTS

| | | |
|---|---|---|
| 8,974,946 B2 | 3/2015 | Cai et al. |
| 9,123,939 B2 | 9/2015 | Xiao et al. |

(Continued)

FOREIGN PATENT DOCUMENTS

| | | |
|---|---|---|
| CN | 114792783 A | 7/2022 |
| DE | 102021131180 A1 | 7/2022 |

*Primary Examiner* — Cynthia H Kelly
*Assistant Examiner* — Monique M Wills
(74) *Attorney, Agent, or Firm* — Harness, Dickey & Pierce, P.L.C.

(57) ABSTRACT

An electrode precursor or slurry according to various aspects of the present disclosure includes a blended electroactive material and a binder solution. The blended electroactive material includes a first electroactive material and a second electroactive material. The first electroactive material includes nickel. The first electroactive material is selected from the group consisting of $LiNi_xCo_yMn_zO_2$ where x is greater than 0.6, $LiNi_xCo_yAl_zO_2$ where x is greater than 0.6, $LiNi_xCo_yMn_zAl_\alpha O_2$ where x is greater than 0.6, or any combination thereof. The second electroactive material includes a phosphor-olivine compound at less than or equal to about 30 weight percent of the blended electroactive material. The binder solution including a polymeric binder and a solvent including N-methyl-2-pyrrolidone. In various aspects, the present disclosure provides a high-nickel-content positive electrode formed from the slurry. In various aspects, the present disclosure provides an electrochemical cell including the positive electrode and a lithium metal negative electrode.

20 Claims, 7 Drawing Sheets

(51) Int. Cl.
  *H01M 4/505* (2010.01)
  *H01M 4/525* (2010.01)
  *H01M 4/62* (2006.01)
  *H01M 10/0525* (2010.01)
  *H01M 4/58* (2010.01)

(52) U.S. Cl.
  CPC ......... *H01M 4/5825* (2013.01); *H01M 4/622* (2013.01); *H01M 10/0525* (2013.01)

(56) References Cited

U.S. PATENT DOCUMENTS

| | | |
|---|---|---|
| 9,160,036 B2 | 10/2015 | Yang et al. |
| 9,252,411 B2 | 2/2016 | Abd Elhamid et al. |
| 9,302,914 B2 | 4/2016 | Liu et al. |
| 9,362,552 B2 | 6/2016 | Sohn et al. |
| 9,373,829 B2 | 6/2016 | Xiao et al. |
| 9,437,871 B2 | 9/2016 | Zhou et al. |
| 9,537,144 B2 | 1/2017 | Huang et al. |
| 9,742,028 B2 | 8/2017 | Zhou et al. |
| 9,896,763 B2 | 2/2018 | Dadheech et al. |
| 9,905,847 B2 | 2/2018 | Dadheech et al. |
| 9,923,189 B2 | 3/2018 | Xiao |
| 9,929,435 B2 | 3/2018 | Cai et al. |
| 9,979,008 B2 | 5/2018 | Dai et al. |
| 9,985,284 B2 | 5/2018 | Dadheech et al. |
| 10,084,204 B2 | 9/2018 | Dai et al. |
| 10,128,481 B2 | 11/2018 | Xiao et al. |
| 10,141,559 B2 | 11/2018 | Xiao et al. |
| 10,199,643 B2 | 2/2019 | Zhou et al. |
| 10,312,501 B2 | 6/2019 | Yang et al. |
| 10,326,166 B2 | 6/2019 | Yang et al. |
| 10,367,201 B2 | 7/2019 | Yang et al. |
| 10,381,170 B2 | 8/2019 | Dai et al. |
| 10,396,360 B2 | 8/2019 | Xiao et al. |
| 10,431,849 B2 | 10/2019 | Yersak et al. |
| 10,573,879 B2 | 2/2020 | Yang et al. |
| 10,622,627 B2 | 4/2020 | Dadheech et al. |
| 10,629,941 B2 | 4/2020 | Dai et al. |
| 10,629,949 B2 | 4/2020 | Yersak et al. |
| 10,680,281 B2 | 6/2020 | Yersak et al. |
| 10,734,673 B2 | 8/2020 | Yersak et al. |
| 2015/0056387 A1 | 2/2015 | Dadheech et al. |
| 2015/0056493 A1 | 2/2015 | Dadheech et al. |
| 2015/0056507 A1 | 2/2015 | Dadheech et al. |
| 2016/0111721 A1 | 4/2016 | Xiao et al. |
| 2016/0172706 A1 | 6/2016 | Xiao et al. |
| 2016/0172710 A1 | 6/2016 | Liu et al. |
| 2017/0271678 A1 | 9/2017 | Yang et al. |
| 2019/0341601 A1* | 11/2019 | Park ...................... H01M 4/623 |
| 2019/0341615 A1 | 11/2019 | Xiao et al. |
| 2019/0372155 A1 | 12/2019 | Yersak et al. |
| 2019/0393549 A1 | 12/2019 | Yersak et al. |
| 2020/0052338 A1 | 2/2020 | Liu et al. |
| 2020/0127282 A1 | 4/2020 | Yersak et al. |
| 2021/0202940 A1* | 7/2021 | Li .......................... C01B 25/45 |

\* cited by examiner

NICKEL-CONTAINING POSITIVE ELECTRODE SLURRIES HAVING REDUCED OR ELIMINATED GELATION AND HIGH-ENERGY-DENSITY POSITIVE ELECTRODES FOR ELECTROCHEMICAL CELLS

INTRODUCTION

This section provides background information related to the present disclosure which is not necessarily prior art.

The present disclosure relates to nickel-containing positive electrode slurries having reduced or eliminated gelation and high-energy-density positive electrodes for electrochemical cells.

High-energy density electrochemical cells, such as lithium-ion batteries can be used in a variety of consumer products and vehicles, such as battery or hybrid electric vehicles. Battery powered vehicles show promise as a transportation option as technical advances continue to be made in battery power and lifetimes.

SUMMARY

This section provides a general summary of the disclosure, and is not a comprehensive disclosure of its full scope or all of its features.

In various aspects, the present disclosure provides an electrode precursor in the form of a slurry for fabricating a high-nickel-content positive electrode for an electrochemical cell. The electrode slurry includes a blended electroactive material and a binder solution. The blended electroactive material includes a first electroactive material and a second electroactive material. The first electroactive material includes nickel. The first electroactive material is selected from the group consisting of $LiNi_xCo_yMn_xO_2$ where x is greater than 0.6, $LiNi_xCo_yAl_zO_2$ where x is greater than 0.6, $LiNi_xCo_yMn_zAl_\alpha O_2$ where x is greater than 0.6, or any combination thereof. The second electroactive material includes a phosphor-olivine compound at less than or equal to about 30 weight percent of the blended electroactive material. The binder solution including a polymeric binder and a solvent including N-methyl-2-pyrrolidone.

In one aspect, the first electroactive material is selected from the group consisting of $LiNi_xCo_yMn_xO_2$ where x is greater than or equal to 0.8, $LiNi_xCo_yAl_zO_2$ where x is greater than or equal to 0.8, $LiNi_xCo_yMn_zAl_\alpha O_2$ where x is greater than or equal to 0.8, or any combination thereof.

In one aspect, the first electroactive material is selected from the group consisting of $LiNi_xCo_yMn_xO_2$ where x is greater than or equal to 0.85, $LiNi_xCo_yAl_zO_2$ where x is greater than or equal to 0.85, $LiNi_xCo_yMn_zAl_\alpha O_2$ where x is greater than or equal to 0.85, or any combination thereof.

In one aspect, the first electroactive material includes NMC 811, NMCA, or both NMC 811 and NMCA.

In one aspect, the second electroactive material includes $Li-M^1-M^2-PO_4$, where $M^1$ is a first transition metal and $M^2$ is a second transition metal different from the first transition metal.

In one aspect, the second electroactive material includes $LiFe_xM_{1-x}\neg PO_4$, where M is a transition metal and x is greater than 0 to less than 1.

In one aspect, the second electroactive material includes LMFP.

In one aspect, the blended electroactive material includes the second electroactive material at less than or equal to about 20 weight percent.

In one aspect, the slurry further includes an electrically-conductive material.

In one aspect, the polymeric binder is selected from the group consisting of polyvinylidene fluoride, polyacrylic acid, styrene-butadiene rubber, polytetrafluoroethylene, or any combination thereof.

In one aspect, the electrode slurry has a pH of less than or equal to about 12.5.

In various aspects, the present disclosure also provides a positive electrode for an electrochemical cell. The positive electrode includes a blended electroactive material and a polymeric binder. The blended electroactive material includes a first electroactive material and a second electroactive material. The first electroactive material includes nickel. The first electroactive material is selected from the group consisting of $LiNi_xCo_yMn_xO_2$ where x is greater than 0.6, $LiNi_xCo_yAl_zO_2$ where x is greater than 0.6, $LiNi_xCo_yMn_zAl_\alpha O_2$ where x is greater than 0.6, or any combination thereof. The second electroactive material includes a phosphor-olivine compound at less than or equal to about 30 weight percent of the blended electroactive material.

In one aspect, the positive electrode defines an average thickness of greater than or equal to about 75 µm to less than or equal to about 100 µm.

In one aspect, the positive electrode is substantially free of acetic acid.

In one aspect, the first electroactive material is selected from the group consisting of $LiNi_xCo_yMn_xO_2$ where x is greater than or equal to 0.8, $LiNi_xCo_yAl_zO_2$ where x is greater than or equal to 0.8, $LiNi_xCo_yMn_zAl_\alpha O_2$ where x is greater than or equal to 0.8, or any combination thereof.

In one aspect, the second electroactive material includes $Li-M^1-M^2-PO_4$, where $M^1$ is a first transition metal and $M^2$ is a second transition metal different from the first transition metal.

In one aspect, the first electroactive material includes NMC 811 and the second electroactive material includes LMFP.

In one aspect, the positive electrode further includes an electrically-conductive material.

In one aspect, the polymeric binder is selected from the group consisting of polyvinylidene fluoride, polyacrylic acid, styrene-butadiene rubber, polytetrafluoroethylene, or any combination thereof.

In various aspects, the present disclosure further provides an electrochemical cell including a positive electrode, a negative electrode, and an electrolyte. The positive electrode includes a blended electroactive material and a polymeric binder. The blended electroactive material includes a first electroactive material and a second electroactive material. The first electroactive material includes nickel. The first electroactive material is selected from the group consisting of $LiNi_xCo_yMn_xO_2$ where x is greater than 0.6, $LiNi_xCo_yAl_zO_2$ where x is greater than 0.6, $LiNi_xCo_yMn_zAl_\alpha O_2$ where x is greater than 0.6, or any combination thereof. The second electroactive material includes a phosphor-olivine compound at less than or equal to about 30 weight percent of the blended electroactive material. The negative electrode includes lithium metal. The electrolyte is between the positive electrode and the negative electrode.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIGS. 4A-4C are photographs of electrode slurries according to certain aspects of the present disclosure; FIG. 4A includes NMC 622; FIG. 4B includes NMC 811; and FIG. 4C includes NCMA;

FIGS. 5A-5B are graphs depicting pH of electrode slurries having different electroactive material blends according to various aspects of the present disclosure; FIG. 5A relates to cathode materials in deionized (DI) water; and FIG. 5B relates to cathode materials in DI water and NMP solvent;

FIGS. 6A-6D are scanning electron microscope (SEM) images of electrodes having different electroactive material blends and/or preparation methods according to various aspects of the present disclosure; FIG. 6A depicts an electrode prepared in air having an electroactive material that is includes 100 weight percent NMC 811; FIG. 6B depicts an electrode prepared in a glovebox having an electroactive material that includes 100 weight percent NMC 811; FIG. 6C is prepared in air and has an electroactive material including 80 weight percent NMC 811 and 20 weight percent LMFP; and FIG. 6D is prepared in air and has an electroactive material including 50 weight percent NMC 811 and 50 weight percent LMFP;

FIGS. 8A-8C relate to single-side electrode thickness as a function of electroactive material blend according to various aspects of the present disclosure; FIGS. 9A-9B relate to performance of electrochemical cells according to various aspects of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first,"

"second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains to rechargeable lithium-ion batteries, which may be used in vehicle applications. However, the present technology may also be used in other electrochemical devices that cycle lithium ions, such as handheld electronic devices or energy storage systems (ESS).

General Electrochemical Cell Function, Structure, and Composition

An electrochemical cell generally includes a first electrode, such as a positive electrode or cathode, a second electrode such as a negative electrode or an anode, an electrolyte, and a separator. Often, in a lithium-ion battery pack, electrochemical cells are electrically connected in a stack to increase overall output. Lithium-ion electrochemical cells operate by reversibly passing lithium ions between the negative electrode and the positive electrode. The separator and the electrolyte are disposed between the negative and positive electrodes. The electrolyte is suitable for conducting lithium ions and may be in liquid, gel, or solid form. Lithium ions move from a positive electrode to a negative electrode during charging of the battery and in the opposite direction when discharging the battery.

Each of the negative and positive electrodes within a stack is typically electrically connected to a current collector (e.g., a metal, such as copper for the negative electrode and aluminum for the positive electrode). During battery usage, the current collectors associated with the two electrodes are connected by an external circuit that allows current generated by electrons to pass between the negative and positive electrodes to compensate for transport of lithium ions.

Electrodes can generally be incorporated into various commercial battery designs, such as prismatic shaped cells, wound cylindrical cells, coin cells, pouch cells, or other suitable cell shapes. The cells can include a single electrode structure of each polarity or a stacked structure with a plurality of positive electrodes and negative electrodes assembled in parallel and/or series electrical connections. In particular, the battery can include a stack of alternating positive electrodes and negative electrodes with separators disposed therebetween. While the positive electroactive materials can be used in batteries for primary or single charge use, the resulting batteries generally have desirable cycling properties for secondary battery use over multiple cycling of the cells.

Figure 1:
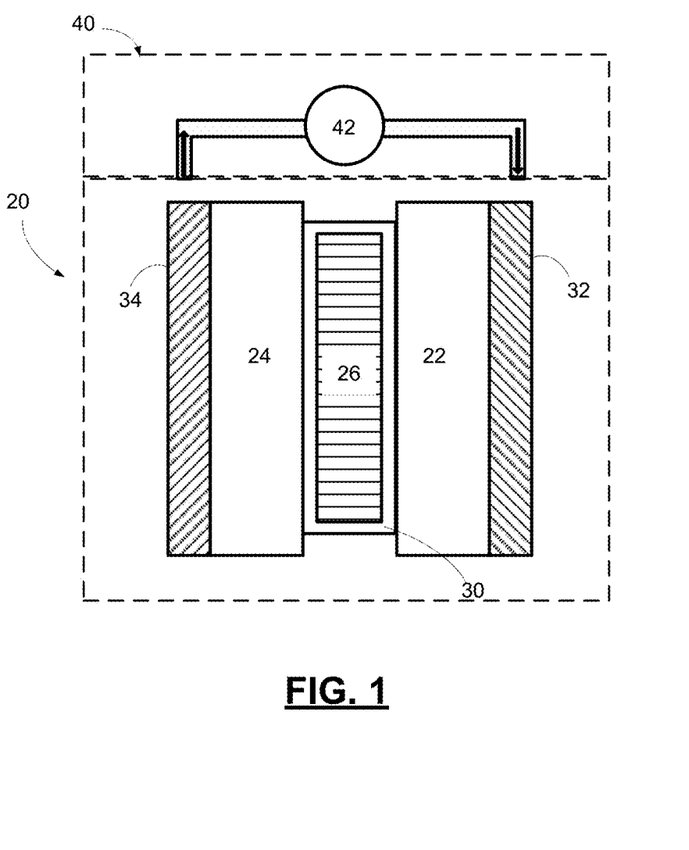
FIG. 1 is a schematic illustration of an electrochemical cell for cycling lithium ions.

An exemplary schematic illustration of a lithium-ion battery 20 is shown in FIG. 1. The lithium-ion battery 20 includes a negative electrode 22, a positive electrode 24, and a porous separator 26 (e.g., a microporous or nanoporous polymeric separator) disposed between the negative and positive electrodes 22, 24. An electrolyte 30 is disposed between the negative and positive electrodes 22, 24 and in pores of the porous separator 26. The electrolyte 30 may also be present in the negative electrode 22 and positive electrode 24, such as in pores.

A negative electrode current collector 32 may be positioned at or near the negative electrode 22. A positive electrode current collector 34 may be positioned at or near the positive electrode 24. While not shown, the negative electrode current collector 32 and the positive electrode current collector 34 may be coated on one or both sides. In certain aspects, the current collectors may be coated with an electroactive material/electrode layer on both sides. The negative electrode current collector 32 and positive electrode current collector 34 respectively collect and move free electrons to and from an external circuit 40. The interruptible external circuit 40 includes a load device 42 connects the negative electrode 22 (through the negative electrode current collector 32) and the positive electrode 24 (through the positive electrode current collector 34).

The porous separator 26 operates as both an electrical insulator and a mechanical support. More particularly, the porous separator 26 is disposed between the negative electrode 22 and the positive electrode 24 to prevent or reduce physical contact and thus, the occurrence of a short circuit. The porous separator 26, in addition to providing a physical barrier between the two electrodes 22, 24, can provide a minimal resistance path for internal passage of lithium ions (and related anions) during cycling of the lithium ions to facilitate functioning of the lithium-ion battery 20.

The lithium-ion battery 20 can generate an electric current during discharge by way of reversible electrochemical reactions that occur when the external circuit 40 is closed (to electrically connect the negative electrode 22 and the positive electrode 24) when the negative electrode 22 contains a relatively greater quantity of cyclable lithium. The chemical potential difference between the positive electrode 24 and the negative electrode 22 drives electrons produced by the oxidation of lithium (e.g., intercalated/alloyed/plated lithium) at the negative electrode 22 through the external circuit 40 toward the positive electrode 24. Lithium ions, which are also produced at the negative electrode, are concurrently transferred through the electrolyte 30 and porous separator 26 towards the positive electrode 24. The electrons flow through the external circuit 40 and the lithium ions migrate across the porous separator 26 in the electrolyte 30 to intercalate/alloy/plate into a positive electroactive material of the positive electrode 24. The electric current passing through the external circuit 40 can be harnessed and directed through the load device 42 until the lithium in the negative electrode 22 is depleted and the capacity of the lithium-ion battery 20 is diminished.

The lithium-ion battery 20 can be charged or re-energized at any time by connecting an external power source (e.g., charging device) to the lithium-ion battery 20 to reverse the electrochemical reactions that occur during battery discharge. The connection of an external power source to the lithium-ion battery 20 compels the lithium ions at the positive electrode 24 to move back toward the negative electrode 22. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with lithium for consumption during the next battery discharge cycle. As such, each discharge and charge event is considered to be a cycle, where lithium ions are cycled between the positive electrode 24 and negative electrode 22.

The external power source that may be used to charge the lithium-ion battery 20 may vary depending on the size, construction, and particular end-use of the lithium-ion battery 20. Some notable and exemplary external power sources include, but are not limited to, AC power sources, such as an AC wall outlet or a motor vehicle alternator. A converter may be used to change from AC to DC for charging the battery 20.

In many lithium-ion battery configurations, each of the negative electrode current collector 32, negative electrode 22, the separator 26, positive electrode 24, and positive electrode current collector 34 are prepared as relatively thin layers (for example, from several microns to a millimeter or less in thickness) and assembled in layers connected in electrical series and/or parallel arrangement to provide a suitable electrical energy and power package. Furthermore, the lithium-ion battery 20 can include a variety of other components that, while not depicted here, are nonetheless known to those of skill in the art. For instance, the lithium-ion battery 20 may include a casing, gaskets, terminal caps, tabs, battery terminals, and any other conventional components or materials that may be situated within the battery 20, including between or around the negative electrode 22, the positive electrode 24, and/or the separator 26, by way of non-limiting example. As noted above, the size and shape of the lithium-ion battery 20 may vary depending on the particular application for which it is designed. Battery-powered vehicles and handheld consumer electronic devices are two examples where the lithium-ion battery 20 would most likely be designed to different size, capacity, and power-output specifications. The lithium-ion battery 20 may also be connected in series or parallel with other similar lithium-ion cells or batteries to produce a greater voltage output, energy, and/or power as required by the load device 42.

Accordingly, the lithium-ion battery 20 can generate electric current to a load device 42 that can be operatively connected to the external circuit 40. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the lithium-ion battery 20 for purposes of storing energy. In certain other variations, the electrochemical cell may be a supercapacitor, such as a lithium-ion based supercapacitor.

Electrolyte

Any appropriate electrolyte 30, whether in solid, liquid, or gel form, capable of conducting lithium ions between the negative electrode 22 and the positive electrode 24 may be used in the lithium-ion battery 20. In certain aspects, the electrolyte 30 may be a non-aqueous liquid electrolyte solution that includes one or more lithium salts dissolved in an organic solvent or a mixture of organic solvents. Numerous non-aqueous liquid electrolyte 30 solutions may be employed in the lithium-ion battery 20. In certain variations, the electrolyte 30 may include an aqueous solvent (i.e., a water-based solvent) or a hybrid solvent (e.g., an organic solvent including at least 1% water by weight).

Appropriate lithium salts generally have inert anions. Non-limiting examples of lithium salts that may be dissolved in an organic solvent to form the non-aqueous liquid electrolyte solution include lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium difluorooxalatoborate ($LiBF_2(C_2O_4)$) (LiODFB), lithium tetraphenylborate ($LiB(C_6H_5)_4$); lithium bis-(oxalate)borate ($LiB(C_2O_4)_2$) (LiBOB); lithium tetrafluorooxalatophosphate ($LiPF_4(C_2O_4)$) (LiFOP), lithium nitrate ($LiNO_3$), lithium hexafluoroarsenate ($LiAsF_6$); lithium trifluoromethanesulfonate ($LiCF_3SO_3$); lithium bis (trifluoromethanesulfonimide) (LITFSI) ($LiN(CF_3SO_2)_2$); lithium fluorosulfonylimide ($LiN(FSO_2)_2$) (LIFSI); and combinations thereof. In certain variations, the electrolyte 30 may include a 1.2 M concentration of the lithium salts.

These lithium salts may be dissolved in a variety of organic solvents, such as organic ethers or organic carbonates, by way of example. Organic ethers may include dimethyl ether, glyme (glycol dimethyl ether or dimethoxyethane (DME, e.g., 1,2-dimethoxyethane)), diglyme (diethylene glycol dimethyl ether or bis(2-methoxyethyl) ether), triglyme (tri(ethylene glycol) dimethyl ether), additional chain structure ethers, such as 1,2-diethoxyethane, ethoxymethoxyethane, 1,3-dimethoxypropane (DMP), cyclic ethers, such as tetrahydrofuran, 2-methyltetrahydrofuran, and combinations thereof. In certain variations, the organic ether compound is selected from the group consisting of: tetrahydrofuran, 2-methyl tetrahydrofuran, dioxolane, dimethoxy ethane (DME), diglyme (diethylene glycol dimethyl ether), triglyme (tri(ethylene glycol) dimethyl ether), 1,3-dimethoxypropane (DMP), and combinations thereof. Carbonate-based solvents may include various alkyl carbonates, such as cyclic carbonates (e.g., ethylene carbonate (EC), propylene carbonate (PC), butylene carbonate) and acyclic carbonates (e.g., dimethyl carbonate (DMC), diethyl carbonate (DEC), ethyl methyl carbonate (EMC)). Ether-based solvents include cyclic ethers (e.g., tetrahydrofuran, 2-methyltetrahydrofuran, 1,3-dioxolane) and chain structure ethers (e.g., 1,2-dimethoxyethane, 1,2-diethoxyethane, ethoxymethoxyethane).

In various embodiments, appropriate solvents in addition to those described above may be selected from propylene carbonate, dimethyl carbonate, diethyl carbonate, methyl ethyl carbonate, γ-butyrolactone, dimethyl sulfoxide, acetonitrile, nitromethane and mixtures thereof.

Where the electrolyte is a solid-state electrolyte, it may include a composition selected from the group consisting of: $LiTi_2(PO_4)_3$, $LiGe_2(PO_4)_3$, $Li_7La_3Zr_2O_{12}$, $Li_3xLa_{2/3}-xTiO_3$, $Li_3PO_4$, $Li_3N$, $Li_4GeS_4$, $Li_{10}GeP_2S_{12}$, $Li_2S-P_2S_5$, $Li_6PS_5Cl$, $Li_6PS_5Br$, $Li_6PS_5I$, $Li_3OCl$, $Li_{2.99}Ba_{0.005}ClO$, or any combination thereof.

Porous Separator

The porous separator 26 may include, in certain variations, a microporous polymeric separator including a polyolefin, including those made from a homopolymer (derived from a single monomer constituent) or a heteropolymer (derived from more than one monomer constituent), which may be either linear or branched. In certain aspects, the polyolefin may be polyethylene (PE), polypropylene (PP), or a blend of PE and PP, or multi-layered structured porous films of PE and/or PP. Commercially available polyolefin porous separator 26 membranes include CELGARD 2500 (a monolayer polypropylene separator) and CELGARD 2340 (a trilayer polypropylene/polyethylene/polypropylene separator) available from CELGARD LLC.

When the porous separator 26 is a microporous polymeric separator, it may be a single layer or a multi-layer laminate. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26. The microporous polymer separator 26 may also include other polymers alternatively or in addition to the polyolefin such as, but not limited to, polyethylene terephthalate (PET), polyvinylidene fluoride (PVDF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers (e.g., polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVdF-hexafluoropropylene or (PVDF-HFP)), and polyvinylidene fluoride terpolymers, polyvinylfluoride, liquid crystalline polymers (e.g., VECTRAN (Hoechst AG, Germany) and ZENITE (DuPont, Wilmington, Del.)), polyaramides, polyphenylene oxide, cellulosic materials, meso-porous silica, or a combination thereof.

Furthermore, the porous separator 26 may be mixed with a ceramic material or its surface may be coated in a ceramic material. For example, a ceramic coating may include alumina ($Al_2O_3$), silicon dioxide ($SiO_2$), or combinations thereof. Various commercially available polymers and commercial products for forming the separator 26 are contemplated, as well as the many manufacturing methods that may be employed to produce such a microporous polymer separator 26.

Solid-State Electrolyte

In various aspects, the porous separator 26 and the electrolyte 30 may be replaced with a solid-state electrolyte (SSE) that functions as both an electrolyte and a separator. The SSE may be disposed between a positive electrode and a negative electrode. The SSE facilitates transfer of lithium ions, while mechanically separating and providing electrical insulation between the negative and positive electrodes 22, 24. By way of non-limiting example, SSEs may include $LiTi_2(PO_4)_3$, $Li_{1.3}Al_{0.3}Ti_{1.7}(PO_4)_3$ (LATP), $LiGe_2(PO_4)_3$, $Li_7La_3Zr_2O_{12}$, $Li_3xLa_{2/3}-xTiO_3$, $Li_3PO_4$, $Li_3N$, $Li_4GeS_4$, $Li_{10}GeP_2S_{12}$, $Li_2S-P_2S_5$, $Li_6PS_5Cl$, $Li_6PS_5Br$, $Li_6PS_5I$, $Li_3OCl$, $Li_{2.99}Ba_{0.005}ClO$, or combinations thereof.

Current Collectors

The negative and positive electrodes 22, 24 are generally associated with the respective negative and positive electrode current collectors 32, 34 to facilitate the flow of electrons between the electrode and the external circuit 40. The current collectors 32, 34 are electrically conductive and can include metal, such as a metal foil, a metal grid or screen, or expanded metal. Expanded metal current collectors refer to metal grids with a greater thickness such that a greater amount of electrode material is placed within the metal grid. By way of non-limiting example, electrically-conductive materials include copper, nickel, aluminum, stainless steel, titanium, alloys thereof, or combinations thereof.

The positive electrode current collector 34 may be formed from aluminum or any other appropriate electrically-conductive material known to those of skill in the art. The negative electrode current collector 32 may be formed from copper or any other appropriate electrically-conductive material known to those of skill in the art. Negative electrode current collectors do not typically include aluminum because aluminum reacts with lithium, thereby causing large volume expansion and contraction. The drastic volume changes may lead to fracture and/or pulverization of the current collector.

Positive and Negative Electrodes

The positive electrode 24 may be formed from or include a lithium-based active material that can undergo lithium intercalation and deintercalation, alloying and dealloying, or plating and stripping, while functioning as the positive terminal of the lithium-ion battery 20. The positive electrode 24 may include a positive electroactive material. Positive electroactive materials may include one or more transition metal cations, such as manganese (Mn), nickel (Ni), cobalt (Co), chromium (Cr), iron (Fe), vanadium (V), and combinations thereof.

The positive electroactive materials may be powder compositions. The positive electroactive materials may be intermingled with an optional electrically-conductive material (e.g., electrically-conductive particles) and a polymeric binder. The binder may both hold together the positive electroactive material and provide ionic conductivity to the positive electrode 24.

The negative electrode 22 may include a negative electroactive material as a lithium host material capable of functioning as a negative terminal of the lithium-ion battery 20. Common negative electroactive materials include lithium insertion materials or alloy host materials. Such materials can include carbon-based materials, such as lithium-graphite intercalation compounds, lithium-silicon compounds, lithium-tin alloys, or lithium titanate $Li_{4+x}Ti_5O_{12}$, where $0 \leq x \leq 3$, such as $Li_4Ti_5O_{12}$ (LTO).

In certain aspects, the negative electrode 22 includes metallic lithium and the negative electrode 22 is a lithium metal electrode (LME). The lithium-ion battery 20 may be a lithium-metal battery or cell. Metallic lithium for use in the negative electrode of a rechargeable battery has various potential advantages, including having the highest theoretical capacity and lowest electrochemical potential. Thus, batteries incorporating lithium-metal anodes can have a higher energy density that can potentially double storage capacity, so that the battery may be half the size, but still last the same amount of time as other lithium-ion batteries.

In certain variations, the negative electrode 22 may optionally include an electrically-conductive material, as well as one or more polymeric binder materials to structurally hold the lithium material together. For example, in one embodiment, the negative electrode 22 may include an active material including lithium-metal particles intermingled with a binder material selected from the group consisting of: polyvinylidene difluoride (PVDF), ethylene propylene diene monomer (EPDM) rubber, carboxymethoxyl cellulose (CMC), a nitrile butadiene rubber (NBR), lithium polyacrylate (LiPAA), sodium polyacrylate (NaPAA), sodium alginate, lithium alginate, or a combination thereof. Suitable additional electrically conductive materials may include carbon-based material or a conductive polymer. Carbon-based materials may include by way of example, particles of KETJEN black, DENKA black, acetylene black, carbon black, and the like. Examples of a conductive polymer include polyaniline, polythiophene, polyacetylene, polypyrrole, and the like. In certain aspects, mixtures of conductive materials may be used. The negative electrode 22 may include about 50-100% by weight of an electroactive material (e.g., lithium particles or a lithium foil), optionally greater than or equal to about 30% by weight of an electrically conductive material, and a balance binder.

Electrode Fabrication

In various aspects, the negative and positive electrodes 22, 24 may be fabricated by mixing the respective electroactive material into a slurry with a polymeric binder compound, a non-aqueous solvent, optionally a plasticizer, and optionally, electrically conductive particles. The slurry can be mixed or agitated, and then thinly applied to a substrate via a doctor blade and/or slot die coating. The substrate can be a removable substrate or alternatively a functional substrate, such as a current collector (such as a metallic grid or mesh layer) attached to one side of the electrode film. In one variation, heat or radiation can be applied to evaporate the solvent from the electrode film, leaving a solid residue. The electrode film may be further consolidated, where heat and pressure are applied to the film to sinter and calender it. In other variations, the film may be dried at moderate temperature to form self-supporting films. If the substrate is removable, then it is removed from the electrode film that is then further laminated to a current collector. With either type of substrate, the remaining plasticizer may be extracted prior to incorporation into the battery cell. In various aspects, a solid electrode may be formed according to alternative fabrication methods.

Optional Electrode Surface Coatings

In certain variations, pre-fabricated negative electrodes 22 and positive electrodes 24 formed via the active material slurry casting described above can be directly coated via a vapor coating formation process to form a conformal inorganic-organic composite surface coating, as described further below. Thus, one or more exposed regions of the pre-fabricated negative electrodes including the electroactive material can be coated to minimize or prevent reaction of the electrode materials with components within the electrochemical cell to minimize or prevent lithium metal dendrite formation on the surfaces of negative electrode materials when incorporated into the electrochemical cell. In other variations, a plurality of particles including an electroactive material, like lithium metal, can be coated with an inorganic-organic composite surface coating. Then, the coated electroactive particles can be used in the active material slurry to form the negative electrode, as described above.

High-Nickel-Content Positive Electrodes

High-nickel-content positive electroactive materials are promising in terms of energy density. However, these active materials may be susceptible to manufacturing challenges that lead to poor uniformity and morphology. More particularly, during preparation of the electrode, a slurry of the high-nickel-content positive electroactive material, polymeric binder, solvent, and optional electrically-conductive material may have a high pH, such as over 12. At the high pH, at least a portion of the polymeric binder may desolvate, causing gelation and inhibiting the slurry's ability to be coated onto a current collector or otherwise formed into an electrode. Some electrode slurries may include a pH adjuster. For example, a negative electrode slurry may include acetic acid to lower the pH. However, inclusion of acetic acid in the positive electrode may damage the electroactive material, leading to decreased performance.

In various aspects, the present disclosure provides an electrode precursor in the form of an electrode slurry for forming a high-nickel-content, high-energy-density positive electrode for an electrochemical cell. The electrode slurry includes a first electroactive material, a second electroactive material, a polymeric binder, and a solvent including N-methyl-2-pyrrolidone (NMP). The first electroactive material includes nickel. The second electroactive material includes a phospho-olivine compound having mixed cations. The phospho-olivine compound lowers a pH of the electrode slurry compared to a slurry without the phospho-olivine compound. The reduction in pH may reduce or prevent gelation of the slurry. A high-nickel-content, high-energy-density positive electrode may be prepared from the slurry.

Figure 2:
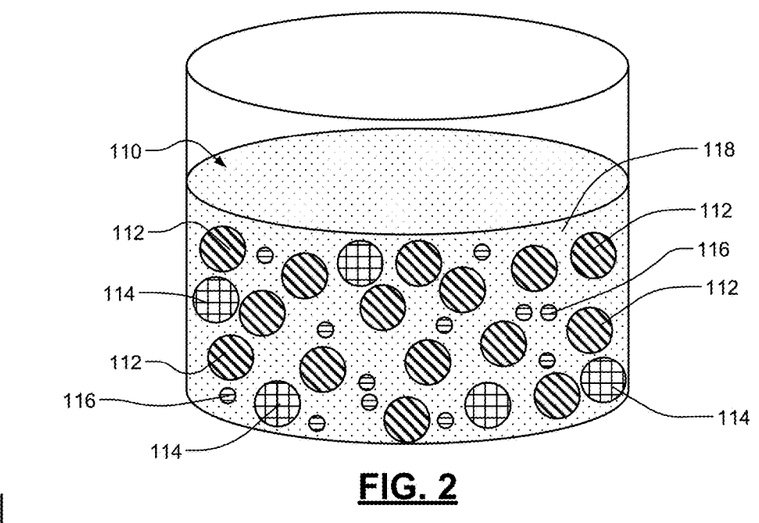
FIG. 2 is a schematic illustration of a high-nickel-content positive electrode slurry according to various aspects of the present disclosure.

With reference to FIG. 2, an electrode slurry 110 according to various aspects of the present disclosure is provided. The electrode slurry 110 includes a blended electroactive material including a first electroactive material 112 and a second electroactive material 114. As used herein, "blended" means an inclusion of at least two different electroactive materials and does not require that the two electroactive materials be homogeneously mixed. The slurry 110 may optionally further include an electrically conductive material 116. The slurry 110 further includes a binder solution 118 including a polymeric binder 120 (FIG. 3) and an NMP solvent. In certain aspects, the slurry 110 is substantially free of acetic acid.

In certain aspects, the slurry 110 includes the blended electroactive material at greater than or equal to about 80 weight percent to less than or equal to about 98 by dry weight percent. In certain aspects, the slurry 110 includes the electrically-conductive material 116 at greater than or equal to 0.5 to less than or equal to about 5 by dry weight percent. In certain aspects, the slurry 110 includes the polymeric binder at greater than or equal to about 0.5 to less than or equal to about 5 by dry weight percent.

The blended electroactive material may include the second electroactive material at less than or equal to about 30 weight percent, optionally less than or equal to about 25 weight percent, optionally less than or equal to about 20 weight percent, or optionally less than or equal to about 15 weight percent. The blended electroactive material may include the second electroactive material at greater than 0 weight percent, optionally greater than or equal to 5 weight percent, optionally greater than or equal to 10 weight percent, optionally greater than or equal to 15 weight percent, optionally greater than or equal to 20 weight percent, or optionally greater than or equal to 25 weight percent. In certain aspects, the blended electroactive material consists essentially of the first electroactive material and the second electroactive material.

A pH of the slurry 110 decreases as the amount of second electroactive material in the blended electroactive material increases (see Example 2). In certain aspects, a pH of the slurry is less than or equal to about 12.5, optionally less than or equal to about 12, optionally less than or equal to about 11.5, optionally less than or equal to about 11, optionally less than or equal to about 10.5, optionally less than or equal to about 10. In general, a positive electrode formed from the slurry (see, e.g., positive electrode 130 of FIG. 3) has an energy density that increases as the amount of the first electroactive material increases.

The first electroactive material 112 includes nickel. In certain aspects, the first electroactive material 112 is a high-nickel-content positive electroactive material. The high-nickel-content positive electroactive material may include Li, $O_2$, and a nickel compound. The nickel compound may include Ni, Co, and Mn and/or Al, by way of example. The nickel compound may include nickel at greater than or equal to about 60 mole percent, optionally greater than about 60 mole percent, optionally greater than or equal to about 65 mole percent, optionally greater than or equal to about 70 mole percent, optionally greater than or equal to about 75 mole percent, optionally greater than or equal to about 80 mole percent, optionally greater than or equal to about 85 mole percent, or optionally greater than or equal to about 90 mole percent.

In certain aspects, the first electroactive material 112 is selected from the group consisting of: $LiNi_xCo_yMn_xO_2$ (NCM) (e.g., $LiNi_{0.8}Co_{0.1}Mn_{0.1}O_2$ (NMC 811), $LiNi_{0.9}Co_{0.05}Mn_{0.05}O_2$); $LiNi_xCo_yAl_zO_2$ (NCA) (e.g., $LiNi_{0.8}Co_{0.15}Al_{0.05}O_2$); $LiNi_xCo_yMn_zAl_\alpha O_2$ (NCMA) (e.g., $Li[Ni_{0.89}Co_{0.05}Mn_{0.05}Al_{0.01}]O_2$); or any combination thereof. In certain aspects, the first electroactive material 112 has a high nickel content and includes $LiNi_xCo_yMn_zO_2$ where x is greater than 0.6 (optionally greater than or equal to 0.7, optionally greater than or equal to about 0.75, optionally greater than or equal to about 0.8, optionally greater than or equal to about 0.85, or optionally greater than or equal to about 0.9); $LiNi_xCo_yAl_zO_2$ where x is greater than 0.6 (optionally greater than or equal to about 0.7, optionally greater than or equal to about 0.75, optionally greater than or equal to about 0.8, optionally greater than or equal to about 0.85, or optionally greater than or equal to about 0.9); $LiNi_xCo_yMn_zAl_\alpha O_2$ where x is greater than 0.6 (optionally greater than or equal to about 0.7, optionally greater than or equal to about 0.75, optionally greater than or equal to about 0.8, optionally greater than or equal to about 0.85, or optionally greater than or equal to about 0.9); or any combination thereof. In an example, the first electroactive material 112 includes NMC 811, NMCA, or both NMC 811 and NMCA.

The second electroactive material 114 includes a phospho-olivine compound with mixed cations. The second electroactive material 114 may have the form of $Li-M^1-M^2-PO_4$, where $M^1$ is a first transition metal and $M^2$ is a second transition metal different from the first transition metal. In certain aspects, the second electroactive material 114 includes $LiFe_xM_{1-x}PO_4$, where M is a transition metal and $0<x<1$. For example, the second electroactive material 114 may include a lithium manganese iron phosphate (LMFP), such as $LiMn_xFe_{1-x}PO_4$, where $0<x<1$. Examples of $LiMn_xFe_{1-x}PO_4$, where $0<x<1$, include $LiMn_{0.7}Fe_{0.3}PO_4$, $LiMn_{0.6}Fe_{0.4}PO_4$, $LiMn_{0.8}Fe_{0.2}PO_4$, and $LiMn_{0.75}Fe_{0.25}PO_4$, by way of example.

The conductive material 116 may include a carbon-based material, a conductive polymer, or both a carbon-based material and a conductive polymer. Carbon-based materials may include by way of example, particles of KETJEN black, DENKA black, acetylene black, carbon black, and the like. Examples of a conductive polymer include polyaniline, polythiophene, polyacetylene, polypyrrole, and the like.

The polymeric binder in the binder solution 118 may be selected from the group consisting of polyvinylidene fluoride (PVDF), polyacrylic acid (PAA), styrene-butadiene rubber (SBR), polytetrafluoroethylene (PTFE), or any combination thereof.

Figure 3:
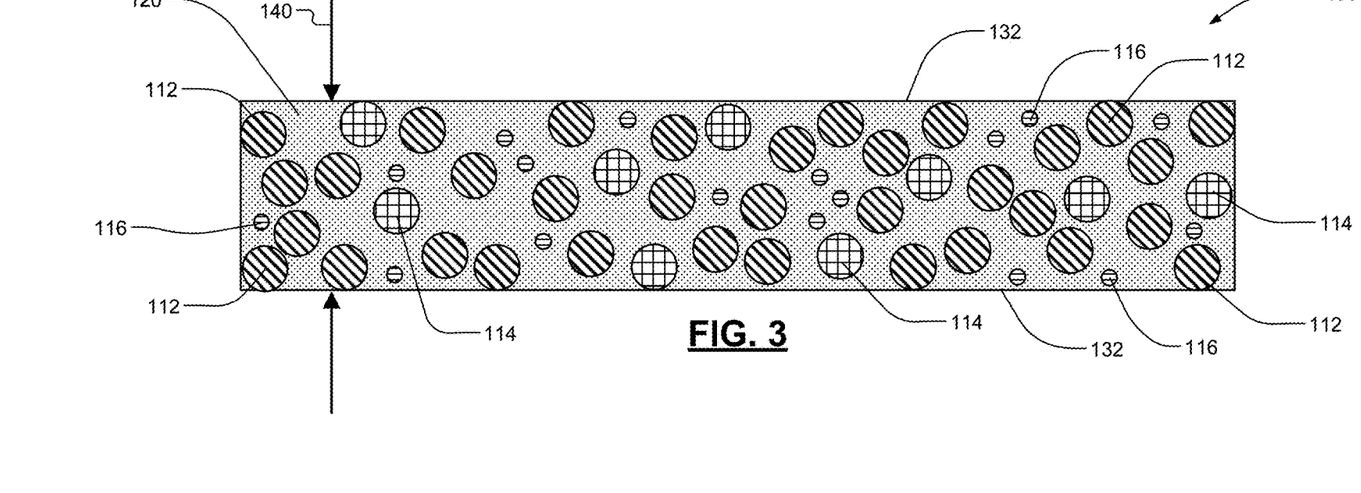
FIG. 3 is a sectional schematic illustration of a high-nickel-content positive electrode formed from the slurry of FIG. 2 according to various aspects of the present disclosure.

Referring to FIG. 3, a positive electrode 130 according to various aspects of the present disclosure is provided. The positive electrode 130 is prepared from the slurry 110 of FIG. 2. The positive electrode 130 includes a blended electroactive material including the first electroactive material 112 and the second electroactive material 114; the electrically-conductive material 116; and the polymeric binder 120. The positive electrode 130 may include the blended electroactive material at greater than or equal to about 80 weight percent to less than or equal to about 98 weight percent, such as greater than or equal to about 80 weight percent to less than or equal to about 85 weight percent, greater than or equal to about 85 weight percent to less than or equal to about 90 weight percent, greater than or equal to about 90 weight percent to less than or equal to about 95 weight percent, greater than or equal to about 95 weight percent to less than or equal to about 98 weight percent, by way of example. In certain aspects, the positive electrode 130 is substantially free of acetic acid.

In certain aspects, the uniformity of the slurry 110 (FIG. 2) having reduced or eliminated gelation facilitates the formation of electrode surfaces 132 having a low roughness. In certain aspects, the positive electrode 130 defines a single-side thickness 140. The single-side thickness 140 may be greater than or equal to about 75 μm to less than or equal to about 100 μm.

In various aspects, the present disclosure provides an electrochemical cell including the positive electrode 130. Except for including the positive electrode, 130, the electrochemical cell may be the same as the lithium ion battery 20 of FIG. 1. In certain aspects, the electrochemical cell includes a negative electrode including lithium metal. The electrochemical cell further includes an electrolyte (e.g., a liquid, gel, or solid electrolyte), and a separator. In certain aspects, the electrolyte includes 1.2M LiPF6 in fluoroethylene (FEC)/dimethyl carbonate (DMC) solvent (1:4 volume ratio). In certain aspects, the electrolyte is a solid state electrolyte that also functions as a separator.

In certain aspects, the electrochemical cell is configured to have a discharge capacity of greater than 160 mAh/g, optionally greater than or equal to 165 mAh/g, optionally greater than or equal to 170 mAh/g, optionally greater than or equal to 175 mAh/g, or optionally greater than or equal to 180 mAh/g.

Example 1: Gelation in High-Nickel-Content Slurries

Three slurries are prepared according to various aspects of the present disclosure, with each slurry having 95 dry weight percent of a nickel-containing positive electroactive material, 2.5 dry weight percent of PVDF as a polymeric binder, and 2.5 dry weight percent conductive carbon as an electrically-conductive material in an NMP solvent. A pH of a slurry in NMP solvent increases as nickel content increases. In a high pH environment, such as at a pH of greater than about 12, the NMP solvent may solvate with lithium of the electroactive material, causing at least a portion of the polymeric binder to desolvate and form an aggregate, which may lead to gelation of the slurry.

Figure 4A:
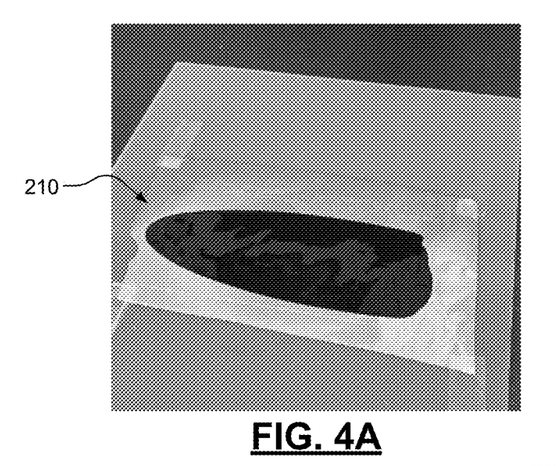

With reference to FIG. 4A, a first slurry 210 according to various aspects of the present disclosure includes 95 dry weight percent $LiNi_{0.6}Co_{0.2}Mn_{0.2}O_2$ (NMC 622), 2.5 dry weight percent PVDF, and dry 2.5 weight percent conductive carbon in NMP solvent (at about 10 g solvent per about 10 g electroactive material). At this nickel content in the electroactive material, the slurry may be applied as a substantially uniform coating (i.e., gelation is minimal or absent).

Figure 4B:
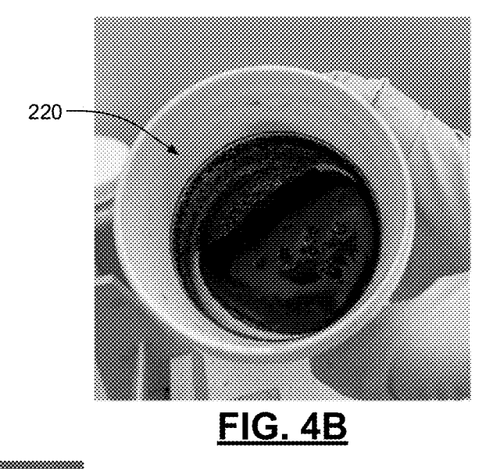

Referring to FIG. 4B, a second slurry 220 according to various aspects of the present disclosure includes 95 dry weight percent NMC 811, 2.5 dry weight percent PVDF, and 2.5 dry weight percent conductive carbon in NMP solvent (at about 10 g solvent per about 10 g electroactive material). At this nickel content in the electroactive material, gelation occurs in the slurry, inhibiting formation of a uniform slurry coating for forming an electrode.

Figure 4C:
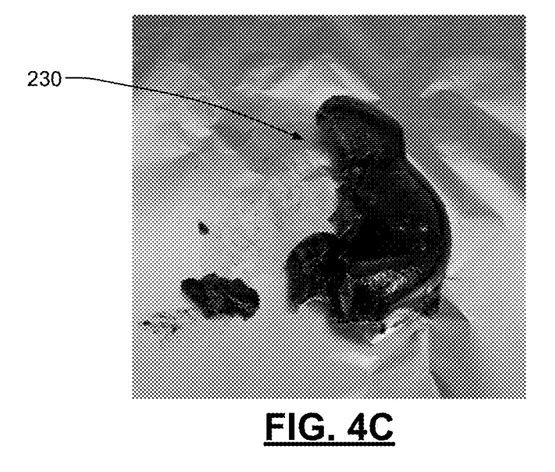

With reference to FIG. 4C, a third slurry 230 according to various aspects of the present disclosure includes 95 dry weight percent NMCA, 2.5 dry weight percent PVDF, and 2.5 dry weight percent conductive carbon in NMP solvent (at about 10 g solvent per about 10 g electroactive material). NMCA has a formula $LiNi_xCo_yMn_zAl_\alpha O_2$ and includes nickel at x being greater than or equal to about 0.9. At this nickel content in the electroactive material, gelation occurs in the slurry, inhibiting formation of a uniform slurry coating for forming an electrode.

Energy density of an electrode increases with increasing nickel content. However, high nickel contents may increase a pH of a slurry and lead to gelation of the slurry and an inhibited ability to form a substantially uniform coating from the slurry, as discussed above. Relative amounts of a first and second electroactive material may be selected to reduce or prevent gelation while optimizing or maximizing energy density.

Example 2: pH Reduction with Phospho-Olivine Compound

As described above, pH increases with increased nickel content. The pH may be lowered to a level that does not cause gelation of the slurry by addition of a second electroactive material including a phospho-olivine compound. Several slurries are prepared having different weight ratios of a first electroactive material including nickel and a second electroactive material including a phospho-olivine compound.

Figure 5A:
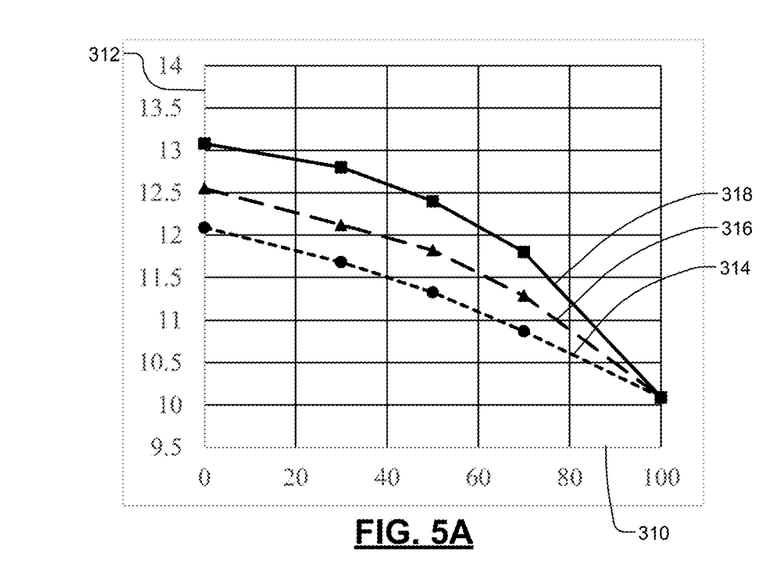

With reference to FIG. 5A, samples including positive materials compositions according to various aspects of the present disclosure are prepared. Each sample includes 1 g of electroactive material (a first electroactive material and/or a second electroactive material) in 10 g of deionized (DI) water. An x-axis 310 represents mass percent of a second electroactive material including LMFP. A y-axis 312 represents pH of the sample. A first curve 314 represents samples including a first electroactive material including NMP 622. A second curve 316 represents samples including a first electroactive material including NMP 811. A third curve 318 represents samples including a first electroactive material including NMCA.

At each LMFP content, the third curve 318 is higher than the first and second curves 314, 316, corresponding to a higher pH, because NMCA has a higher nickel content than NMC 622 and NMC 811. At each LMFP content, the second curve 216 is higher than the first curve 314 because NMC 811 has a higher nickel content than NMC 622. For each curve 314, 316, 318, pH decreases as LMFP content increases.

Figure 5B:
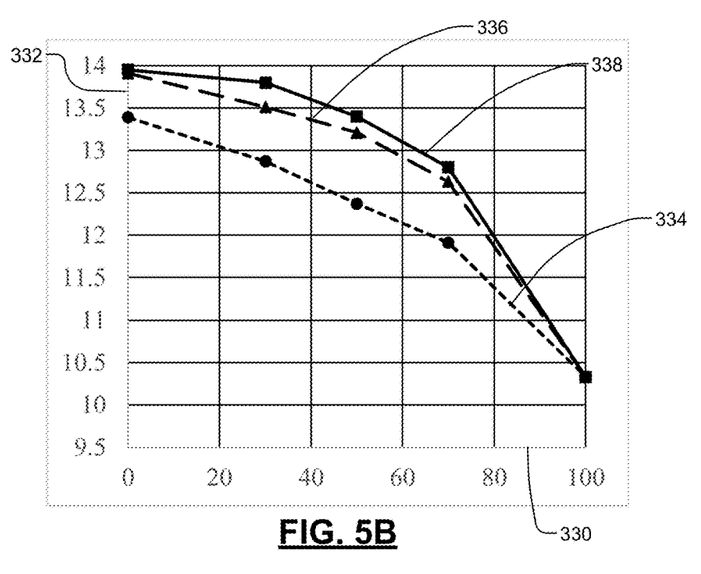

Referring to FIG. 5B, samples positive electrode materials according to various aspects of the present disclosure are prepared. Each sample includes 1 g of electroactive material (a first electroactive material and/or a second electroactive material) in a solution of 5 g of DI water and 5 g of NMP solvent. An x-axis 330 represents mass percent of a second electroactive material including LMFP. A y-axis 332 represents pH of the sample. A first curve 334 represents samples including a first electroactive material including NMP 622. A second curve 336 represents samples including a first electroactive material including NMP 811. A third curve 338 represents samples including a first electroactive material including NMCA.

At each LMFP content, the third curve 338 is higher than the first and second curves 334, 336, corresponding to a higher pH, because NMCA has a higher nickel content than NMC 622 and NMC 811. At each LMFP content, the second curve 336 is higher than the first curve 334 because NMC 811 has a higher nickel content than NMC 622. For each curve 334, 336, 338, pH decreases as LMFP content increases. The curves 334, 336, 338 are generally higher than the curves 314, 316, 318 of FIG. 5A on the respective y-axes 332, 312, indicating that the presence of NMP further increases the pH of a sample compared to DI water alone.

Example 3: Improved Electrode Morphology with Phospho-Olivine Compound

Figure 6A:
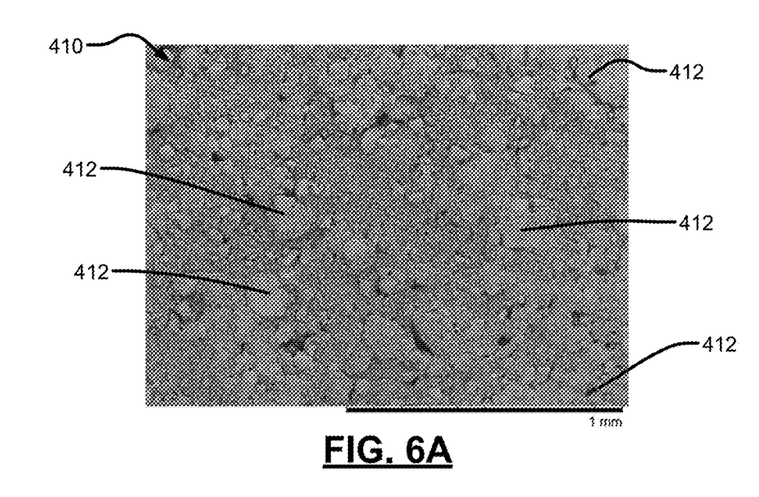

Four electrodes according to various aspects of the present disclosure are prepared. Each electrode includes 96 dry weight percent electroactive material, 2 dry weight percent PVDF binder, and 2 dry weight percent conductive carbon. With reference to FIG. 6A, an electrode 410 is prepared in air (i.e., a moisture-containing environment). The electrode 410 includes 100 weight percent NMC 811 electroactive material. The electrode 410 has a non-uniform morphology including a plurality of clusters 412 due to aggregation of the PVDF binder and gelation of the electrode slurry.

Figure 6B:
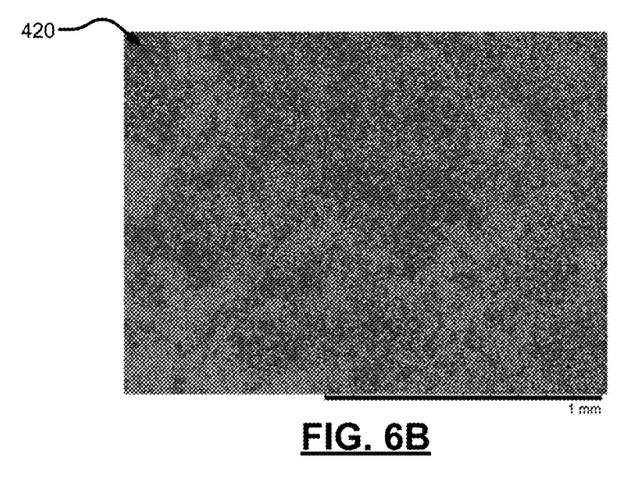

Referring to FIG. 6B, an electrode 420 includes 100 weight percent NMC 811 electroactive material. The electrode 420 is prepared in a glove box having a moisture-controlled environment that is extremely dry, having a water content of less than about 2 ppm. The electrode 420 has an improved morphology and decreased gelation compared to the electrode 410 of FIG. 6A.

Figure 6C:
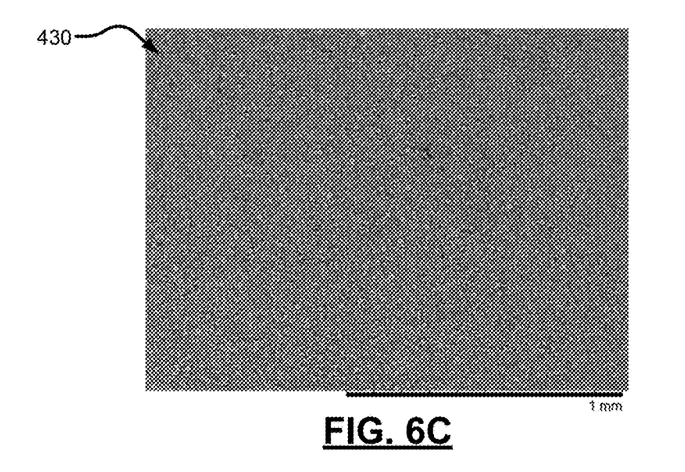

With reference to FIG. 6C, an electrode 430 includes a blended electroactive material including 80 weight percent NMC 811 and 20 weight percent LMFP. The electrode 430 is prepared in air. The electrode 430 has an improved morphology compared to the electrodes 410, 420 of FIGS. 6A and 6B, respectively.

Figure 6D:
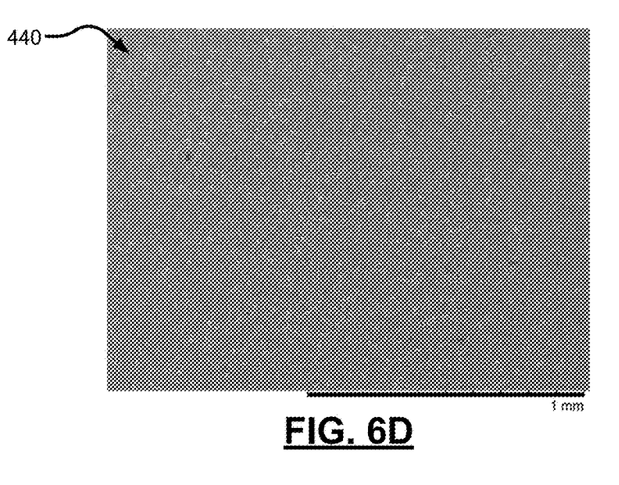

With reference to FIG. 6D, an electrode 440 includes a blended electroactive material including 50 weight percent NMC 811 and 50 weight percent LMFP. The electrode 440 is prepared in air. The electrode 440 has an improved morphology compared to the electrodes 410, 420, 430 of FIGS. 6A, 6B, and 6C, respectively.

Adding a second electroactive material including a phospho-olivine compound to a nickel-containing electrode slurry is effective to improve morphology and texture and reduce or prevent gelation. Although the morphology of the 100 weight percent NMC 811 electrode 420 may be acceptable, large-scale manufacturing in an environment with tight moisture control may be challenging. Accordingly, the addition of the second electroactive material including the phospho-olivine compound to the slurry facilitates the preparation of a substantially uniform high-nickel-content positive electrode with acceptable morphology in air, without the need to control moisture in the environment.

Example 4: Effect of Phospho-Olivine Compound on Energy Density

In various aspects, the present disclosure provides high-energy-density positive electrodes. In certain aspects, a positive electrode includes a blended electroactive material including first and second electroactive materials. The first electroactive material includes NMC 811 and the second electroactive material includes LMFP. The NMC 811 has a capacity delivery of 185 mAh/g, a normalized voltage of 3.8 V, and a material level energy density of 703 wh/kg. The LMFP has a capacity delivery of 155 mAh/g, a normalized voltage of 4 V, and a material level energy density of 620 wh/kg.

Figure 7:
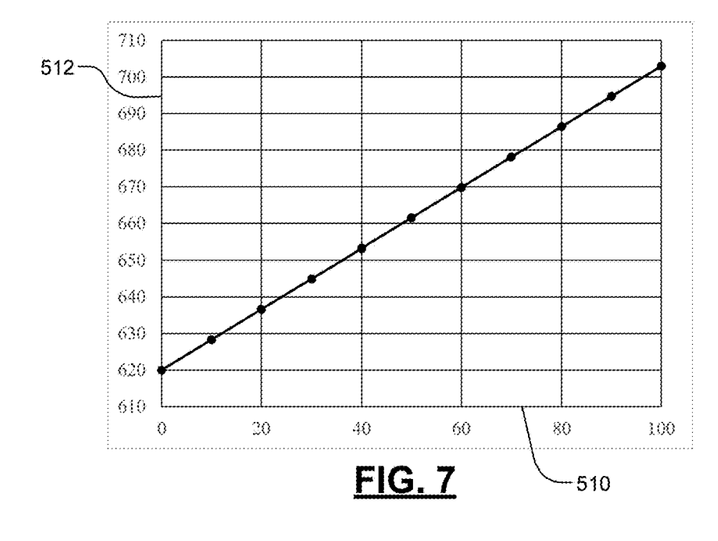
FIG. 7 is a graph depicting energy density as a function of electroactive material blend according to various aspects of the present disclosure.

Electrodes including first and/or second electroactive materials according to various aspects of the present disclosure are prepared. Referring to FIG. 7, a graph of positive electroactive material energy density as a function of NCM 811 content according to various aspects of the present disclosure is provided. An x-axis 510 represents weight percent NCM 811, with a balance of the electroactive material being LMFP. A y-axis 512 represents electroactive material energy density in wh/kg.

Energy density increases as NMC 811 content increases and LMFP content decreases. However, as shown in Example 2, pH (and gelation) also increase as NMC 811 content increases. The energy density is greater than about 678 wh/kg for an electroactive material having an NMC 811 content of greater than or equal to about 70 weight percent, greater than about 686 wh/kg for an electroactive material having an NMC 811 content of greater than or equal to about 90 weight percent, and greater than about 694 wh/kg for an electroactive material having an NMC 811 content of greater than or equal to about 80 weight percent.

Example 5: Effect of Phospho-Olivine Compound on Single-Side Electrode Thickness With reference to FIG. 8A, a graph showing a relationship between LMFP content and electrode thickness according to various aspects of the present disclosure is provided. Electrodes are prepared having a positive electroactive material including NMC 811 as a first electroactive material and/or LMFP as a second electroactive material. The electrodes include 96 weight percent of electroactive material. The electrodes further include 2 weight percent of PVDF as a polymeric binder and 2 weight percent of conductive carbon as an electrically-conductive material.

Figure 8A:
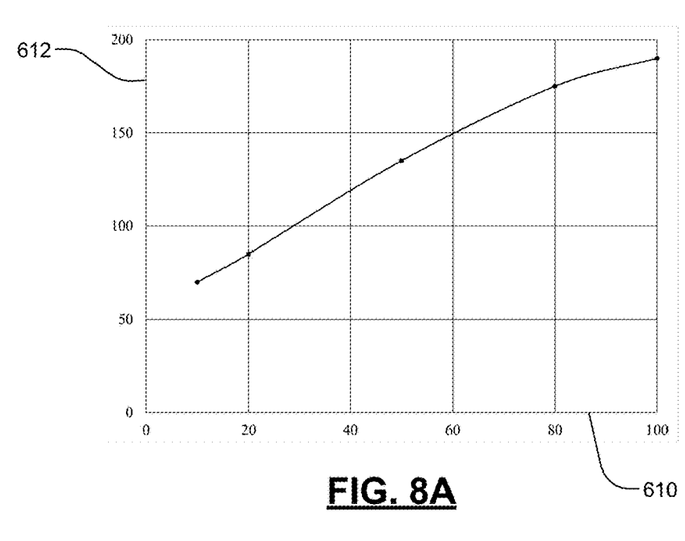
FIG. 8A is a graph depicting single-side electrode thickness as a function of electroactive material blend.

An x-axis 610 represents weight percent LMFP. A y-axis 612 represents a single-side electrode thickness in µm for an electrode having an active material loading of 3.75 mAh/cm². Thickness of the electrode increases as LMFP content increases. A single-side electrode having an LMFP content of less than or equal to about 30 weight percent and a 3.75 mAh/cm² may have a thickness of less than or equal to about 100 µm.

Figure 8B:
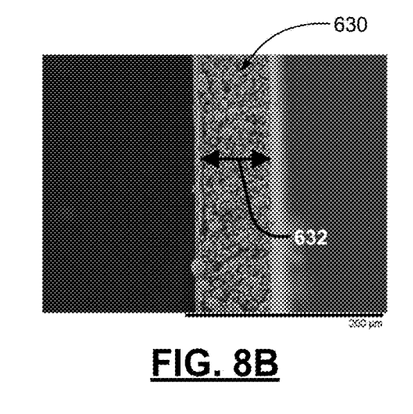
FIG. 8B is an SEM image of an electrode having 100 weight percent NMC 811 as an electroactive material.

FIG. 8B depicts a positive electrode 630 according to various aspects of the present disclosure. The electrode 630 includes 100 weight percent NMC 811 and 0 weight percent LMFP in the electroactive material. The electrode includes 96 weight percent of the electroactive material. The electrode 630 further includes 2 weight percent of PVDF as a polymeric binder and 2 weight percent of conductive carbon as an electrically-conductive material. The electrode 630 defines an average thickness 632 75 µm.

Figure 8C:
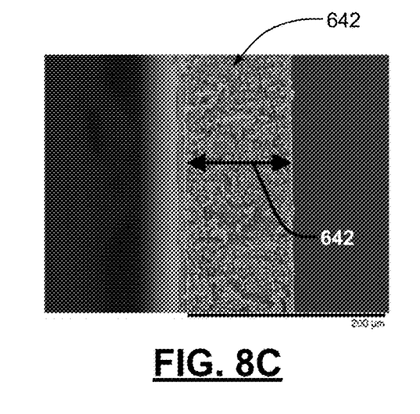
FIG. 8C is an SEM image of an electrode having a blended electroactive material including 70 weight percent NMC 811 and 30 weight percent LMFP.

FIG. 8C depicts a positive electrode 640 according to various aspects of the present disclosure. The electrode 640 includes about 70 weight percent NMC 811 and about 30 weight percent LMFP in the electroactive material. The electrode includes the electroactive material at 96 weight percent. The electrode 640 further includes 2 weight percent of PVDF as a polymeric binder and about 2 weight percent of conductive carbon as an electrically-conductive material. The electrode 640 defines a thickness 642 of about 100 µm.

Example 6: Performance in Electrochemical Cells

Figure 9A:
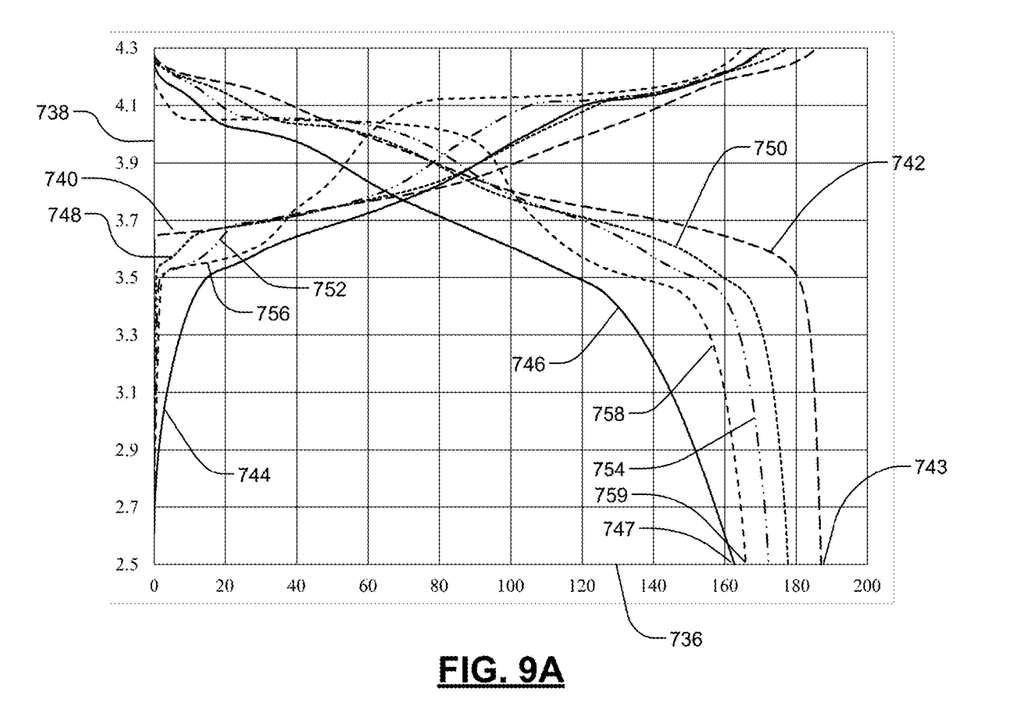
FIG. 9A is a graph depicting capacity retention.
Figure 9B:
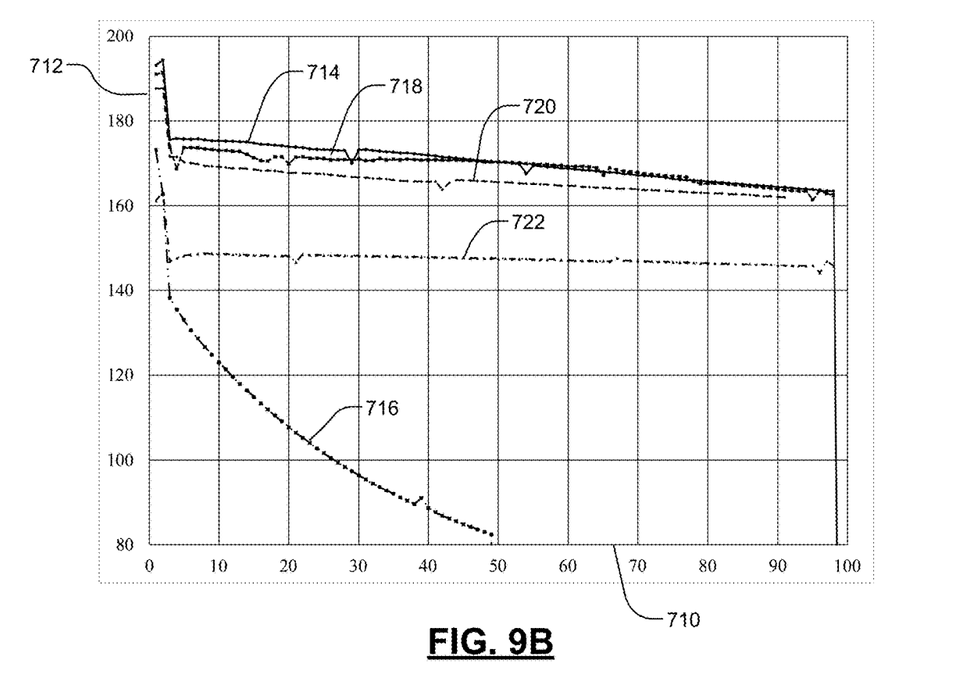
FIG. 9B is a graph depicting voltage profiles for charge and discharge.

Referring to FIG. 9A-9B, electrochemical performance of different electrochemical cells having positive electrodes according to various aspects of the present disclosure is provided. Each electrochemical cell includes a lithium metal negative electrode having a thickness of 30 µm and 25 µL of a fluoroethylene carbonate (FEC)-based electrolyte. Each positive electrode has an active material loading of about 3.75 mAh/cm². The cells are cycled at a 0.2 C constant charge rate and a 0.5 C constant discharge rate.

Five electrochemical cells are prepared according to Table 1 below, with each electrochemical cell having a different positive electrode. The weight percentages in the table below refer to weight percentages in the positive electroactive material rather than in the positive electrode. Each electrode includes 96 weight percent of the electroactive material (NMC 811 or NMC 811+LMFP), 2 weight percent of PVDF as a polymeric binder, and 2 weight percent of amorphous carbon (C45) as an electrically-conductive material.

TABLE 1

| Electrochemical Cell | Positive Electrode | | |
|---|---|---|---|
| | NMC 811 wt. % | LMFP wt. % | Preparation Environment |
| 1 | 100 | 0 | Glove box |
| 2 | 100 | 0 | Air |

TABLE 1-continued

| Electrochemical Cell | Positive Electrode | | |
|---|---|---|---|
| | NMC 811 wt. % | LMFP wt. % | Preparation Environment |
| 3 | 80 | 20 | Air |
| 4 | 50 | 50 | Air |
| 5 | 20 | 80 | Air |

With reference to FIG. 9A, capacity retention is depicted for each of the five electrochemical cells. An x-axis 710 represents cycle number and a y-axis 712 represents capacity in mAh/g. A first curve 714 represents capacity of the first electrochemical cell. A second curve 716 represents capacity of the second electrochemical cell. A third curve 718 represents capacity of the third electrochemical cell. A fourth curve 720 represents capacity of the fourth electrochemical cell. A fifth curve 722 represents capacity of the fifth electrochemical cell.

The second electrochemical cell including the positive electrode prepared in air and having 100 weight percent NMC 811 experiences significant capacity fade, as indicated by the second curve 716. More particularly, after about 50 cycles, a capacity of the second electrochemical cell is reduced by about 50 percent. In contrast, the first, third, fourth, and fifth electrochemical cells all exhibit acceptable capacity retention after 100 cycles.

Referring to FIG. 9B, charge and discharge voltages profiles are depicted for each of the five electrochemical cells. An x-axis 736 represents capacity in mAh/g and a y-axis 738 represents voltage in V. A first curve 740 represents a voltage profile during charge of the first electrochemical cell. A second curve 742 represents a voltage profile during discharge of the first electrochemical cell. The first electrochemical cell achieves a discharge capacity 743 of almost about 190 mAh/g. A third curve 744 represents a voltage profile during charge of the second electrochemical cell. A fourth curve 746 represents a voltage profile during discharge of the second electrochemical cell. The second electrochemical cell achieves a discharge capacity 747 of about 160 mAh/g, that gelation of the slurry may occur when prepared in the presence of moisture (i.e., in air). A fifth curve 748 represents a voltage profile during charge of the third electrochemical cell. A sixth curve 750 represents a voltage profile during discharge of the third electrochemical cell. A seventh curve 752 represents a voltage profile during charge of the fourth electrochemical cell. An eighth curve 754 represents a voltage profile during discharge of the fourth electrochemical cell. A ninth curve 756 represents a voltage profile during charge of the fifth electrochemical cell. A tenth curve 758 represents a voltage profile during discharge of the fifth electrochemical cell. The fifth electrochemical cell achieves a discharge capacity 759 of about 170 mAh/g. The discharge capacity 759 of the fifth electrochemical cell higher than the discharge capacity 474 of the second electrochemical cell including 100% NMC 811 active material prepared in air, which indicates that the presence of may LMFP decreases gelation and improves discharge capacity.

Notably, when a weight percentage of NMC 811 in the active material increases from 20 weight percent to 80 weight percent, a discharge capacity is increased from 170 mAh/g to 190 mAh/g. However, when an electrode is prepared in The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrode slurry for fabricating a high-nickel-content positive electrode for an electrochemical cell, the electrode slurry comprising:
    a blended electroactive material including,
        a first electroactive material including nickel, the first electroactive material being selected from the group consisting of $LiNi_{0.8}Co_{0.1}Mn_{0.1}O_2$, $LiNi_{0.9}Co_{0.05}Mn_{0.05}O_2$, $LiNi_{0.8}Co_{0.15}Al_{0.05}O_2$, $Li[Ni_{0.89}Co_{0.05}Mn_{0.05}Al_{0.01}]O_2$, and
        a second electroactive material including a phosphor-olivine compound at less than or equal to about 30 weight percent of the blended electroactive material, the phosphor-olivine compound being selected from of $LiMn_{0.7}Fe_{0.3}PO_4$, $LiMn_{0.6}Fe_{0.4}PO_4 LiMn_{0.8}Fe_{0.2}PO_4$, and $LiMn_{0.75}Fe_{0.25}PO_4$, or any combination thereof; and
    a binder solution including a polymeric binder and a solvent including N-methyl-2-pyrrolidone.

2. The electrode slurry of claim 1, wherein the blended electroactive material includes the second electroactive material at less than or equal to about 20 weight percent.

3. The electrode slurry of claim 1, further comprising:
    an electrically-conductive material.

4. The electrode slurry of claim 1, wherein the polymeric binder is selected from the group consisting of polyvinylidene fluoride, polyacrylic acid, styrene-butadiene rubber, polytetrafluoroethylene, or any combination thereof.

5. The electrode slurry of claim 1, wherein the electrode slurry has a pH of less than or equal to about 12.5.

6. A positive electrode for an electrochemical cell comprising:
    a blended electroactive material including,
        a first electroactive material including nickel, the first electroactive material being selected from the group consisting of $LiNi_{0.8}Co_{0.1}Mn_{0.1}O_2$, $LiNi_{0.9}Co_{0.05}Mn_{0.05}O_2$, $LiNi_{0.8}Co_{0.15}Al_{0.05}O_2$, $Li[Ni_{0.89}Co_{0.05}Mn_{0.05}Al_{0.01}]O_2$, or any combination thereof, and
        a second electroactive material including a phosphor-olivine compound at less than or equal to about 30 weight percent of the blended electroactive material, the phosphor-olivine compound being selected from of $LiMn_{0.7}Fe_{0.3}PO_4$, $LiMn_{0.6}Fe_{0.4}PO_4 LiMn_{0.8}Fe_{0.2}PO_4$, and $LiMn_{0.75}Fe_{0.25}PO_4$, or any combination thereof; and
    a polymeric binder.

7. The positive electrode of claim 6, wherein the positive electrode defines an average thickness of greater than or equal to about 75 µm to less than or equal to about 100 µm.

8. The positive electrode of claim 6, wherein the positive electrode is substantially free of acetic acid.

9. The positive electrode of claim 6, further comprising:
    an electrically-conductive material.

10. The positive electrode of claim 6, wherein the polymeric binder is selected from the group consisting of polyvinylidene fluoride, polyacrylic acid, styrene-butadiene rubber, polytetrafluoroethylene, or any combination thereof.

11. An electrochemical cell comprising:
a positive electrode including,
- a blended electroactive material including,
  - a first electroactive material including nickel, the first electroactive material being selected from the group consisting of $LiNi_{0.8}Co_{0.1}Mn_{0.1}O_2$, $LiNi_{0.9}Co_{0.05}Mn_{0.05}O_2$, $LiNi_{0.8}Co_{0.15}Al_{0.05}O_2$, $Li[Ni_{0.89}Co_{0.05}Mn_{0.05}Al_{0.01}]O_2$, or any combination thereof, and
  - a second electroactive material including a phosphor-olivine compound at less than or equal to about 30 weight percent of the blended electroactive material, the phosphor-olivine compound being selected from of $LiMn_{0.7}Fe_{0.3}PO_4$, $LiMn_{0.6}Fe_{0.4}PO_4$, $LiMn_{0.8}Fe_{0.2}PO_4$, and $LiMn_{0.75}Fe_{0.25}PO_4$, or any combination thereof, and
- a polymeric binder;
a negative electrode including lithium metal; and
an electrolyte between the positive electrode and the negative electrode.

12. The electrode slurry of claim 1, wherein
the blended electroactive material comprises a first plurality of particles comprising the first electroactive material and a second plurality of particles comprising the second electroactive material, and
the first plurality of particles is intermingled with the second plurality of particles.

13. The positive electrode of claim 6, wherein
the blended electroactive material comprises a first plurality of particles comprising the first electroactive material and a second plurality of particles comprising the second electroactive material, and
the first plurality of particles is intermingled with the second plurality of particles.

14. The positive electrode of claim 6, wherein the blended electroactive material includes the second electroactive material at less than or equal to about 20 weight percent.

15. The positive electrode of claim 6, wherein the blended electroactive material includes the second electroactive material at less than or equal to about 15 weight percent.

16. The positive electrode of claim 6, wherein the first electroactive material includes the $LiNi_{0.8}Co_{0.1}Mn_{0.1}O_2$.

17. The positive electrode of claim 6, wherein the first electroactive material includes the $Li[Ni_{0.89}Co_{0.05}Mn_{0.05}Al_{0.01}]O_2$.

18. The electrochemical cell of claim 11, wherein
the blended electroactive material comprises a first plurality of particles comprising the first electroactive material and a second plurality of particles comprising the second electroactive material, and
the first plurality of particles is intermingled with the second plurality of particles.

19. The positive electrode of claim 11, wherein the blended electroactive material includes the second electroactive material at less than or equal to about 20 weight percent.

20. The positive electrode of claim 11, wherein the first electroactive material includes the $LiNi_{0.8}Co_{0.1}Mn_{0.1}O_2$, the $Li[Ni_{0.89}Co_{0.05}Mn_{0.05}Al_{0.01}]O_2$, or a combination thereof.

* * * * *